April 7, 1931.  C. F. RUBSAM  1,799,254
DEMOUNTABLE RIM
Filed Nov. 30, 1923
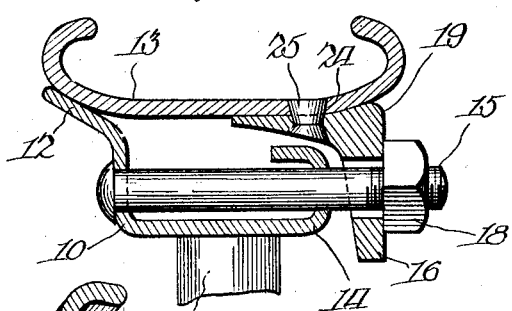
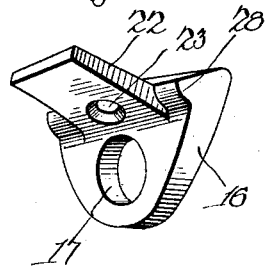
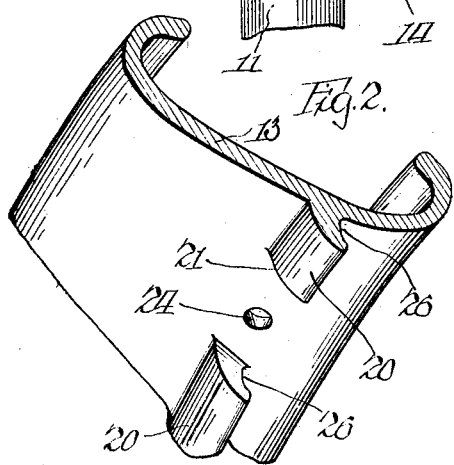
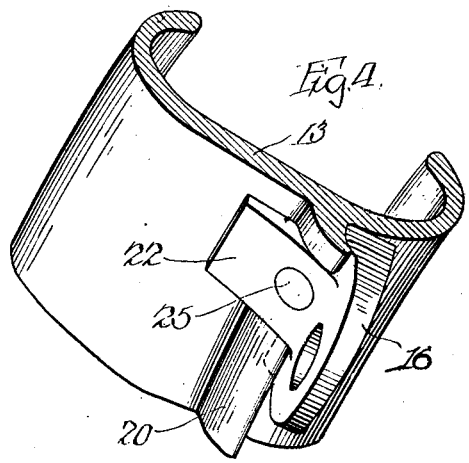
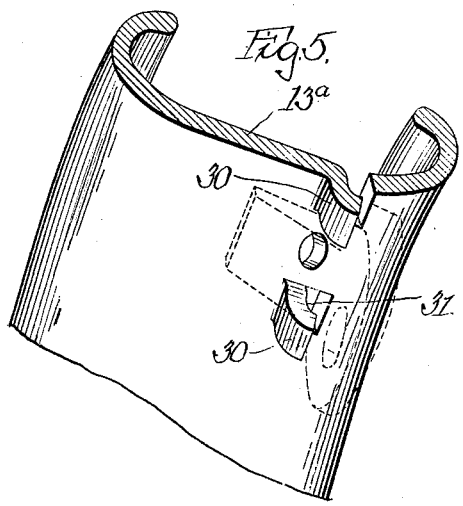
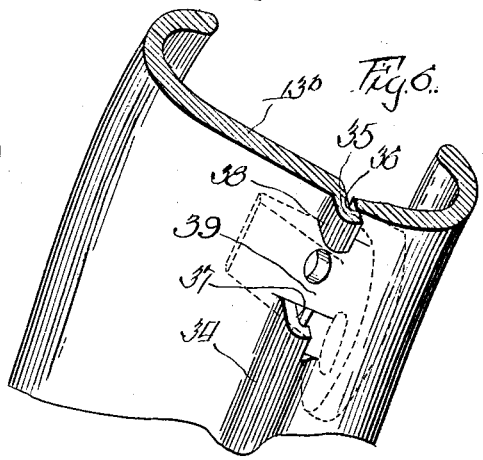
Inventor:
Charles F. Rubsam
by Fred Gerlach
his Atty.

Patented Apr. 7, 1931

1,799,254

UNITED STATES PATENT OFFICE

CHARLES F. RUBSAM, OF JACKSON, MICHIGAN

DEMOUNTABLE RIM

Application filed November 30, 1923. Serial No. 677,596.

The invention relates to demountable rims for vehicle wheels and more particularly to that type, in which lugs, through which bolts for attaching the demountable rim to a fixed rim pass, are fixedly secured to the demountable rim.

Heretofore, it has been the practice to rivet or weld the lugs against the inner periphery of the demountable rim. This practice has been found to be deficient, because of the severe stresses to which the lug is subjected when the bolts are tightened to secure the demountable rim on the fixed rim or felloe band. The object of the invention is to provide an improved construction by which the usual securing means, such as the rivet or welding is supplemented by an interfitting or interlocking connection between the lug and the demountable rim, which will greatly relieve the rivets and the weld-joints of shear stresses, as well as those tending to force the lug and rim-base apart. Another object of the invention is to provide a demountable rim construction which is an improvement upon that disclosed in an application for Letters Patent of the United States filed by me July 2, 1923, Serial No. 648,914.

The invention consists in the several novel features hereinafter set forth and more particularly defined by claims at the conclusion hereof.

In the drawings: Fig. 1 is a section through a wheel equipped with a demountable rim embodying the invention. Fig. 2 is a perspective of a portion of the demountable rim before a wedge-lug has been secured thereto. Fig. 3 is a perspective of the bolt-lug. Fig. 4 is a perspective of the demountable rim with the bolt-lug secured thereto. Fig. 5 is a perspective of a demountable rim embodying a modified form of the invention. Fig. 6 is a perspective of a demountable rim embodying still another modified form of the invention.

The invention is exemplified in a wheel comprising a fixed rim 10 which is secured in any suitable manner on spokes 11, is of the channel type, is provided with a flared integral flange 12 forming a flared seat for one side of the demountable rim 13, and is provided with an inturned flange 14 at the other side thereof which is radially spaced from the rim. Bolts 15 extend through the sides of the fixed channel rim 10 and are held therein. Lugs 16 in any suitable or desired number are fixed to the demountable rim 13 and are provided with holes 17 through which the projecting end of bolt 15, at one side of rim 10, is adapted to pass, so that the nut 18 threaded to the bolt will engage the outer side or face 19 of the lug and force it laterally to force the demountable rim 13 onto the flared seat 12 of the fixed rim. The demountable rim 13 is of the standard clincher type, but it will be understood that any other suitable form, such as the straight side type, may be used.

In the form of the invention shown in Figs. 1 to 4, an annular rib 20 is formed integral with, and projects inwardly from, the base or inner periphery of the demountable rim. This bead is cut away, as at 21, to receive the member 22 of the lug 16 which abuts against the inner portion of the base of the demountable rim. Lug-member 22 is provided with a hole 23 and the base of rim 13 is provided with a hole 24 through which a rivet 25 passes, to fixedly secure the lug against the inner periphery of the demountable rim. The outer side of bead 20 is undercut as at 26. Lug 16, adjacent its ends, is formed with reversely undercut members or portions 28, which are adapted to fit into the undercut side of bead 20 and to form an interlocking connection between the lug and the rim, by which they will be secured together against relative radial movement. As a result, the pressure of the nut 18 against the outer side of lug 16 will be transmitted to the demountable rim through the abutting faces of members 28 of the lug 16 and the bead 20. This interlocking connection between the lug and the rim will prevent shear stresses on the rivet 25 from the pressure of nuts 18 and will also prevent inward radial movement of the lug relatively to the rim and thus prevent the lug from stripping the rivet head or from being pulled away from the demountable rim.

Fig. 5 illustrates a modification in which the interlocking connection for each lug 16 is formed by shearing the demountable rim 13ª to form integral tongues 30 which are bent inwardly and provided with undercut faces 31 to interlock with the members 28 of the lug 16 respectively. The member 22 of the lug is adapted to fit between the tongues 30 and is riveted to the base of the demountable rim as hereinbefore described.

In Fig. 6, the invention is illustrated in connection with a demountable rim 13ᵇ which is provided with an annular inrolled bead 34, portions of which are sheared, as at 35, and bent towards the rim-base as at 36, leaving bead portions 38 with undercut side faces 37 which are adapted to interlock with members 28 of the lug. The rim-base, between the ends of the bead-portions 38, is hammered or pounded flat as at 39 to receive the lug member 22 which is riveted to the demountable rim as hereinbefore described.

The invention exemplifies a demountable rim with attached lugs, in which the lugs are secured to the rim and are additionally interlocked therewith to relieve the attaching devices of stresses which tend to separate the lug from the rim.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In combination, a demountable rim comprising a base, outwardly extending tire-holding flanges, and a member projecting inwardly from the inner portion of the base, and an L-shaped lug having one leg thereof fitting against and secured to the inner face of the base and provided at the side thereof with a part engaging the inwardly projecting member and interlocked with the latter against relative radial movement, the other leg of the lug having an aperture for an attaching bolt.

2. In combination, a demountable rim comprising a base, outwardly extending tire-holding flanges, and a pair of members spaced one from the other and projecting inwardly from the inner portion of the base, and an L-shaped lug having one leg thereof positioned between the members and secured against the inner face of the base and provided at the sides thereof with parts engaging said members and interlocked with the latter against relative radial movement, the other leg of the lug having an aperture for an attaching bolt.

3. In combination, a demountable rim comprising a base, outwardly extending tire-holding flanges, and an undercut bead projecting inwardly from the inner portion of the base and embodying a cutaway portion, and an L-shaped lug having one leg thereof positioned in the cutaway portion and secured to the inner face of the base and provided at the sides thereof with reversely undercut parts engaging the bead and interlocked with the latter against relative radial movement, the other leg of the lug having an aperture for an attaching bolt.

Signed at Chicago, Illinois, this 7th day of November, 1923.

CHARLES F. RUBSAM.